(12) United States Patent
Lehmann

(10) Patent No.: US 6,339,899 B1
(45) Date of Patent: Jan. 22, 2002

(54) DEVICE, ESPECIALLY FOR GROWING PLANTS

(76) Inventor: Erich Lehmann, Arnhofen 82, D-93326 Abensberg-Arnhofen (DE)

( * ) Notice: Subject to any disclaimer, the term of this patent is extended or adjusted under 35 U.S.C. 154(b) by 0 days.

(21) Appl. No.: 09/600,230

(22) PCT Filed: Nov. 24, 1998

(86) PCT No.: PCT/EP98/07578

§ 371 Date: Sep. 15, 2000

§ 102(e) Date: Sep. 15, 2000

(87) PCT Pub. No.: WO99/35898

PCT Pub. Date: Jul. 22, 1999

(30) Foreign Application Priority Data

Jan. 14, 1998 (DE) ......................................... 198 01 141

(51) Int. Cl.[7] ................................................. A01G 9/02
(52) U.S. Cl. ................................. 47/65.5; 47/73; 47/79
(58) Field of Search ............................. 47/65.5, 73, 79

(56) References Cited

U.S. PATENT DOCUMENTS

| | | | |
|---|---|---|---|
| 3,800,469 A | 4/1974 | Lau, Jr. et al. .................. | 47/34 |
| 4,057,931 A | 11/1977 | Stutelberg et al. ............. | 47/66 |
| 4,510,712 A | 4/1985 | Whitcomb ...................... | 47/66 |
| 5,040,330 A | 8/1991 | Belgiorno ....................... | 47/73 |
| 5,094,032 A | 3/1992 | Byland et al. .................. | 47/66 |

FOREIGN PATENT DOCUMENTS

| | | |
|---|---|---|
| DE | 31 19 778 A1 | 12/1982 |
| DE | 34 90 714 C3 | 7/1986 |
| DE | 87 02 188.9 | 5/1987 |
| EP | 0 065 108 B1 | 11/1982 |
| EP | 0 575 298 A1 | 12/1993 |
| EP | 0 578 153 A1 | 1/1994 |
| EP | 0 599 798 A1 | 6/1994 |
| EP | 0 724 826 A1 | 8/1996 |
| WO | WO 85/05247 | 12/1985 |

OTHER PUBLICATIONS

Gartnerborse, 17/1995, pp. 743–746 with translation of marked portion of p. 746.

Primary Examiner—Peter M. Poon
Assistant Examiner—F. Copier
(74) Attorney, Agent, or Firm—Gifford, Krass, Groh, Sprinkle, Anderson & Citkowski, P.C.

(57) ABSTRACT

The invention relates to a device (1), especially for growing plants, having at least one pot (2) in which the base is provided with a plurality of openings (10). Each opening (10) has a first part (12) which is formed in the base (3) and extends up to the pot wall (4). Each opening (10) also has a second part (13) which is formed in an area of the pot wall (4) located close to the base and which is adjacent to said first part (12). The first part (12) of the opening (10) is covered in the inner space of the pot by forming lateral passage openings (20) with a ridge (15) which is at least partially set at a distance from the base (3). The root tips die as soon as they reach the passage openings (20) between the ridge (15) and the base (3) since they come in contact with light and air. As a result, undesired turning growth of the roots is prevented in a simple manner.

11 Claims, 5 Drawing Sheets

DEVICE, ESPECIALLY FOR GROWING PLANTS

The invention relates to a device, especially for growing plants, according to the preamble of claim 1.

Devices are known from practice which are also called growing pot or growing plate. Regarding these pots the base of the respective pot is normally provided with a plurality of openings through which excess pouring water may be discharged from the pot. Such pots normally have a circular cross section conically enlarging from the base to the upper pot opening. Such pots are used in many gardening establishments and plant nurseries for the propagation, growing and further culture of plants, and may however also serve for arranging plants of either kind in the household.

With respect to such pots the following problem arises regarding the growing of the roots. If the root strikes against the pot wall, the root cannot penetrate the wall and, therefore, grows along the pot wall spirally downward to the base of the pot. As soon as the root has reached the base of the pot, the root grows annularly along the pot wall such that an uncontrolled turning growth of the roots takes place in the pot. The roots are not in a position to grow back into the centre of the pot. Such a strong turning growth of the roots may disadvantageously affect the growth of the plant especially during a later setting-out.

The essential disadvantages are to be seen in that the predominant turning growth of the roots in the pot will also be maintained after the setting-out of the plant into open land and that the roots can only poorly break out of the turning growth. Therefore, rooting of the earth shall take place only with delay. This leads to a reduced absorption of water and nutrients by the roots;

with increasing thickness of the root the turning growth in course of time leads to a constriction of the root neck, the absorption of water and nutrients is further negatively affected thereby;

because of the reduced rooting in the earth only an insufficient anchoring of the plant in the soil takes place such that the danger that for instance deciduous trees or conifers may fall down, is substantially increased;

the reduced rooting out of the turning growth also implies an increased cultivation effort during the first time after the setting-out since an exsiccating of the conglomerate of roots may occur due to the poor rooting of the roots in the surrounding earth. Such plants are hence to be watered more often and possibly with greater water volumes.

Furthermore, so-called growing plates are known from practice which comprise a plurality of combined pots. The turning growth of the roots may in fact be prevented with respect to growing plates without base; this however leads to an increased expenditure of labour since the growing plates are to be arranged in a raised position, and only growing plates having small pots may be used, since the substrate, like for example peat, sand or a clay mixture, or the humus soil would fall through the pot being formed without base with respect to growing plates comprising pots having greater diameters.

A device according to the above mentioned manner is known from U.S. Pat. No. 4,510,712. In this document the problem of the spiral growing of the roots is in fact mentioned, there are however proposed therein devices for preventing the turning growth which are vertically arranged at the inner wall of the pot wall. A plurality of drain holes are provided in the lower portion of the lateral pot wall.

Examples for pots having openings in the base are further known from the journal "Gärtnerbörse 17/1995, page 746".

The growing pot known from EP-A1-0 599 798 comprises a lateral drain opening debouching into a cavity which is at least partly confined to the outside by ridges. According to this document each cavity is confined by side walls.

It is an object of the present invention to provide a device especially for growing plants according to which the turning growth of the roots is effectively prevented in a simple manner.

According to the present invention this object is solved by a device of the predescribed manner comprising the features of claim 1.

According to the present invention the first part of the opening is covered in the inner space of the pot by forming lateral openings by means of a ridge which is at least partly set at a distance from the base. During the filling of the pot for example with humus the ridge prevents a penetration of the humus into the at least one opening such that the opening will not be filled with earth or substrate. Thus, a radially arranged passage opening is formed respectively between the ridge and the base of the pot on each side of the ridge. As soon as the roots reach the open air through the passage opening they come into contact with light and the surrounding atmosphere, like for example air. As a result, the root tips die, and the undesired turning growth of the roots does not take place any longer. It is further advantageous that the plant will faster continue with growing after being repotted or transplanted into a larger pot or into open land, since the roots the tips of which have been died in the region of the passage openings, start at once with the new formation of roots after contact with the earth. This leads to a faster rooting out of the old conglomerate of roots and to a "better bearing" connecting between the plant and the new earth or substrate. By means of the strong new formation of the roots a good anchoring of the plant in the soil takes place in every direction such that the danger of falling down for the plant occurs less often. As a result, the prevention of turning growth of the roots of plants is effectively possible in a simple manner.

It is further advantageous that the ridge is arranged in a substantially horizontal direction or that the ridge is formed in a V-shaped manner having the tip directed to the first part of the at least one opening, wherein the tip of the ridge preferably lies in the plane of the underside of the base. The V-shaped forming of the ridge may prevent a further growing of the root over the first part of the opening and, therefore, the turning growth of the root especially regarding pots having small diameters.

According to a further embodiment of the present invention, the first part of the at least one opening is formed in the base like a rectangle and has a longitudinal axis extending in a radial direction of the pot. It is ensured thereby that a root growing at the base of the pot in the circumferential direction thereof reaches the region of the opening at the latest after one complete turning and, therefore, comes into contact with light and air such that a further turning growth of the root is prevented. By means of the particular formation of the at least one opening comprising two parts formed in the base and in the pot wall, the device according to the present invention may be put down on a ground without problem since the portion (cavity) arranged between the passage openings and covered by the ridge is sufficiently provided with light and oxygen also in this case.

It is further advantageous that the second part of the at least one opening formed in the region of the pot wall close to the base trapezoidally enlarges to the base or is shaped in the form of two adjacent triangular openings having tips directed to the filling opening of the pot. This embodiment of the present invention contributes to a good stackability of the subject matter of the present invention. Moreover, the second part of the at least one opening receives more light and oxygen in its portion close to the base by means of the trapezoidal or doubly provided triangular form of said second part than in a region farther away from the base.

According to another embodiment of the present invention, one end of the ridge is connected to the pot wall and the opposing, other end of the ridge is connected with the base by means of a nearly vertical wall. It is ensured thereby that the ridge is not pressed downward by a higher weight of the humus or the plant and that the cross-section of each passage opening is also completely maintained with respect to an increased weight acting onto the ridge from above. A constriction or reduction of the cross-sectional area of the passage openings are effectively prevented by such a supporting of the ridge. Large passage openings block less easy and render possible a safer discharging of excess pouring water. It is further advantageous that the ridge is slightly narrower and shorter than the underlying first part of the at least one opening formed in the base and that the wall is trapezoidally enlarged toward the base as well as slightly inclined to the edge of the pot. These features of the subject matter of the present invention favour like the predescribed trapezoidal form of the second part of the at least one opening a good stackability of the subject matter of the present invention.

According to a further embodiment of the present invention, the at least one ridge comprises a radially arranged, vertical partition wall on its bottom side directed to the first part of the at least one opening formed in the bottom in the level of its equally radially disposed center line over its entire length, the bottom edge of the partition wall being nearly aligned with the bottom side of the base. Thus, a circumferential further growing of the roots is effectively prevented above all with respect to smaller pots having a narrow first part of the at least one opening formed in the base, and a bridging of this part of the opening by the roots is also effectively prevented.

According to another embodiment of the present invention, four openings are provided, respectively adjacent openings enclosing an angle of about 90° in the circumferential direction of the pot. The turning growth of the roots is further reduced thereby, since a root growing along the base in the circumferential direction of the pot early comes into contact with an opening and, therefore, with light and air and dies at its tip.

According to an advantageous embodiment of the present invention, the pot wall comprises at least one substantially vertical guide rib extending away from the inner side of the pot wall in a radial direction to the inner space of the pot. The guide rib preferably has a nearly triangular cross-section decreasing from the base to the filling opening of the pot. By means of this feature a turning growth of the roots of the plants is further reduced, since the roots are already prevented from further growing in the circumferential direction of the pot above the base. As a result, the roots are early directed to the bottom and come soon into contact with one of the openings according to the present invention. The cross-section of the guide ribs decreasing from bottom to top facilitates the stacking of the device, since the guiding ribs further comprise a centering effect in the sense of a double action.

It is further advantageous that four guide ribs are provided and that respectively adjacent guide ribs enclose an angle of about 90° in the circumferential direction of the pot. According to a preferred embodiment of the present invention, guide ribs and openings alternate in the circumferential direction of the pot or coincide such that a guide rib extends away from a ridge along the pot wall. Thus, the roots directed to the base by means of a guide rib come into contact with the opening after a ⅛ or ¼ turning, respectively, such that the turning growth is effectively prevented in an early state.

In the following, embodiments of the present invention are explained in more detail with respect to the drawing wherein FIG. 1 is a perspective view of a first embodiment of a device for growing plants wherein the device is shown standing on the top, i.e. with the base upward, for the purpose of a better graphical representation of the features according to the present invention;

Figure 1:
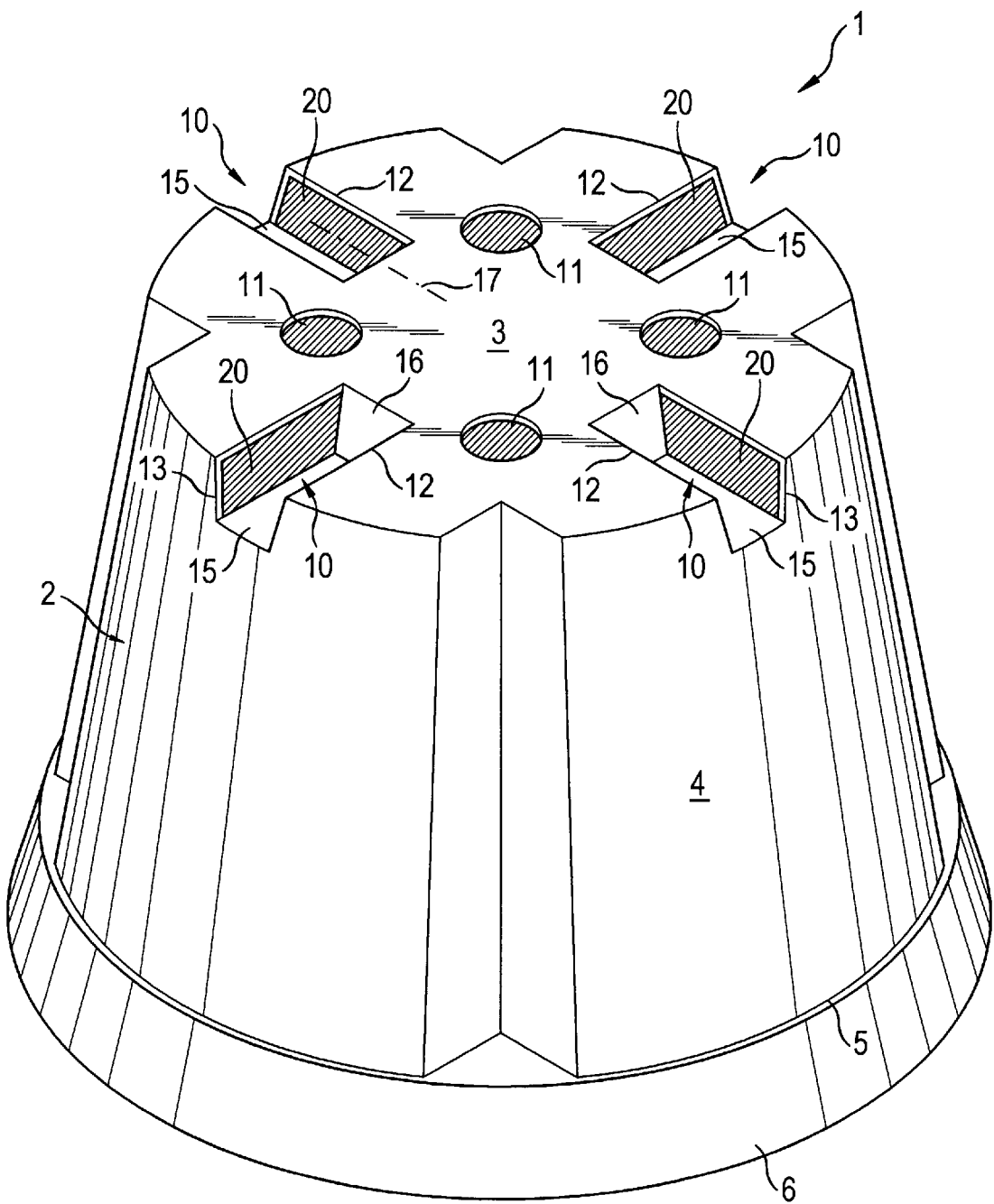

In FIGS. 1 to 4 a first embodiment of a device 1 especially for growing plants is schematically shown in a perspective view. In the choosen embodiment the device 1 is a pot 2 which is presented in FIG. 1 with its base 3 upward, i.e. standing on the top.

The pot 2 has a pot wall 4 connected with the base 3 which pot wall encloses a circular cross-section. According to FIG. 3 the pot wall 4 passes over a nearly horizontal shoulder 5 to a drawn up edge 6. The area enclosed by the edge 6 forms the filling opening 7 of the pot.

Figure 2:
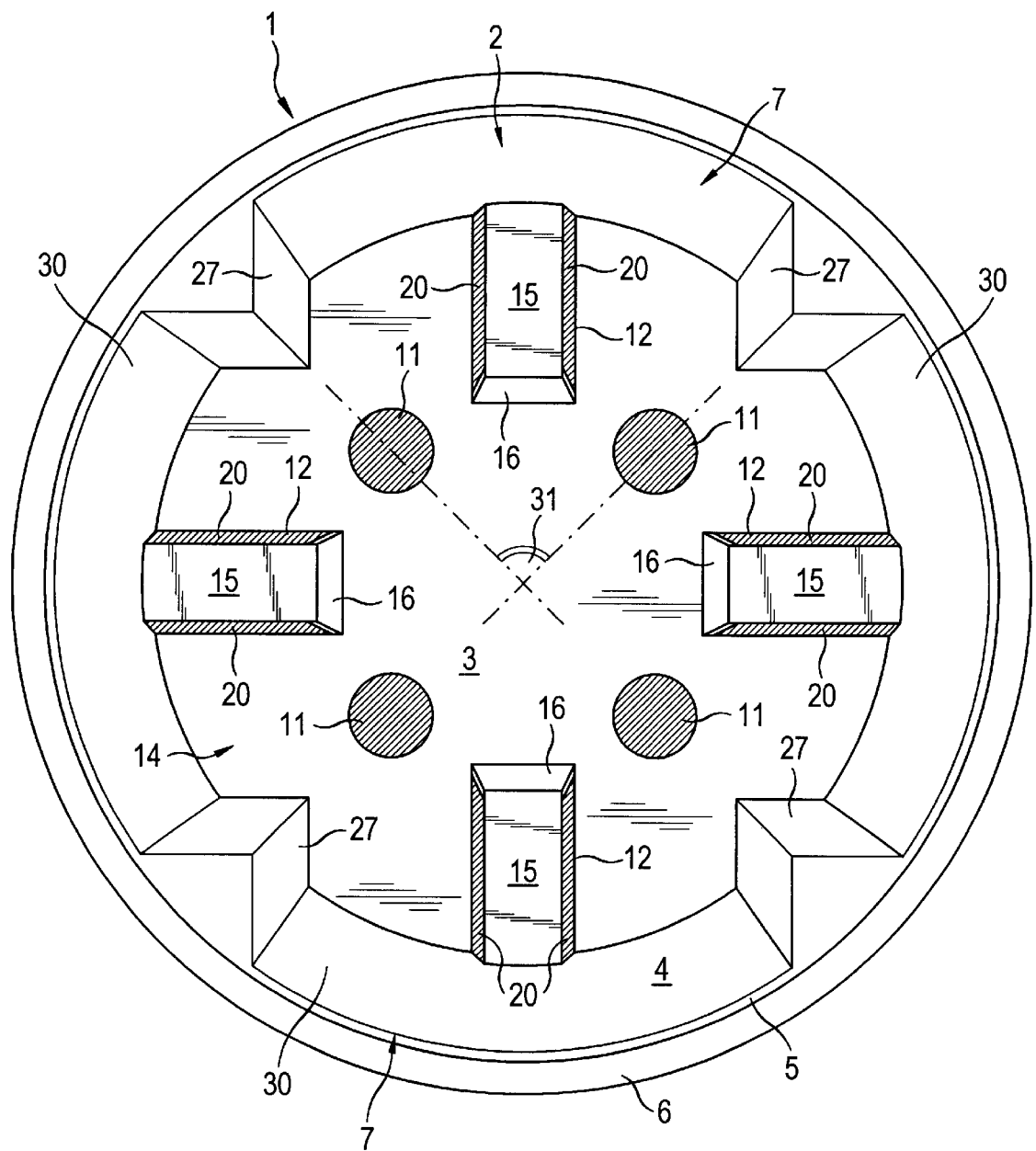
FIG. 2 is a top view of the embodiment of the device according to FIG. 1.

According to FIGS. 1 and 2 the pot wall 4 is conically formed and enlarged toward the filling opening 7 such that the respective pots can be stacked one upon the other without problem and the shoulder 5 of each upper pot lies upon the edge 6 of the underlying pot in this condition.

Figure 3:
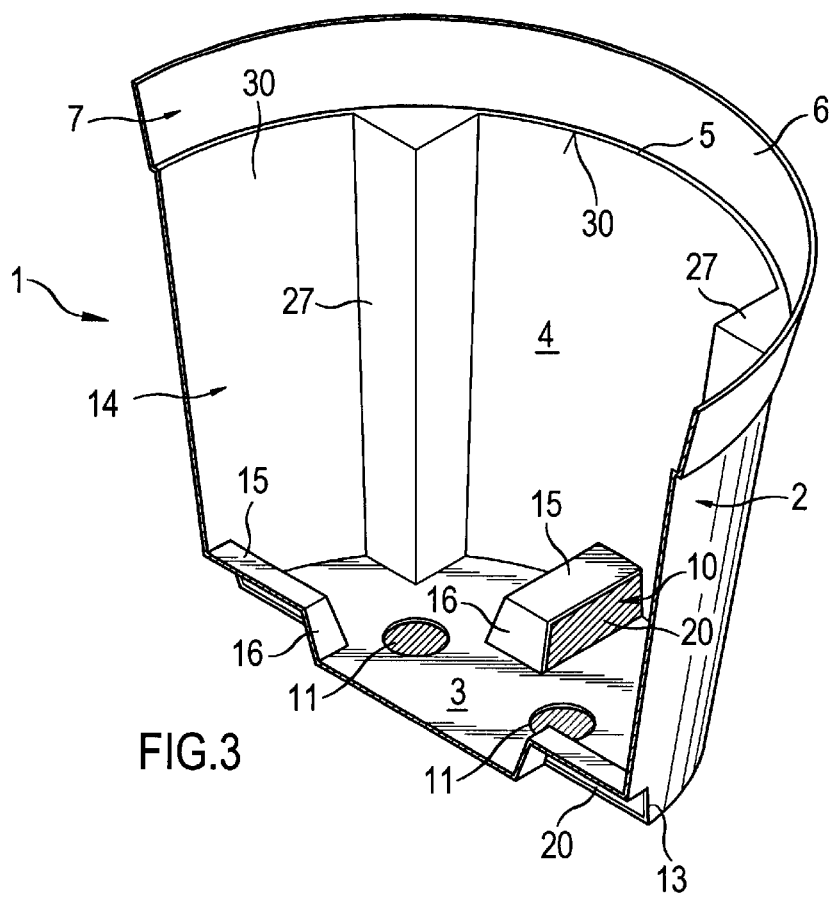
FIG. 3 is a schematic, perspective view of a vertical section through the device for growing plants.
Figure 4:
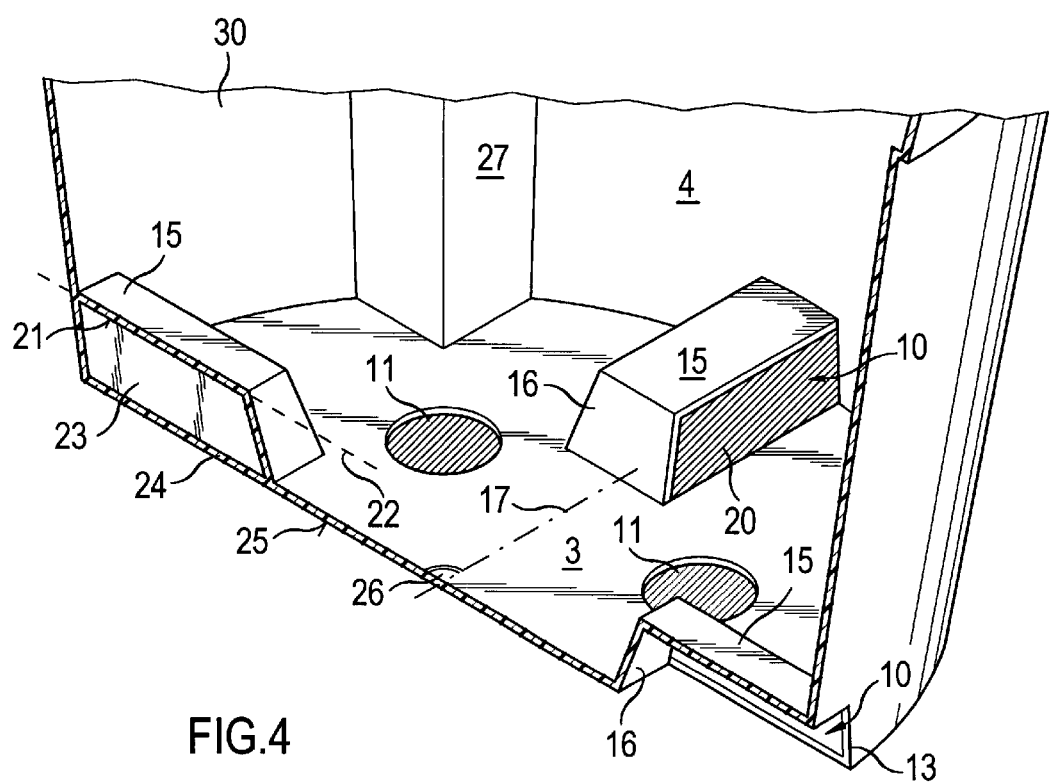
FIG. 4 is a schematic, enlarged view of a part of the device shown in FIG. 3.

According to the present invention a plurality of openings 10, 11 is provided in the base 3 of the pot. The openings 11 are shaped in the form of circular holes. The other openings 10 respectively comprise a first part 12 formed in the base 3 and extending to pot wall 4 and a second part 13 directly adjacent or combined therewith and formed in the portion of the pot wall 4 close to the base. As shown in FIGS. 3 and 4 in more detail the first part 12 of the opening 10 formed in the base 3 is covered in the inner space 14 of the pot by means of a horizontal ridge 15 at least partly set at a distance from the base 3. The one end of the ridge 15 is connected with the pot wall 4, and the opposing, other end of the ridge 15 is connected with the base 3 by means of a vertical wall 16. In order to ensure or to improve the stackability of the pots 2 the ridge 15 is somewhat narrower and shorter than the underlying first part 12 of the opening 10 formed in the base 3. Moreover, the wall 16 for connecting the inner end of the ridge with the base 3 is trapezoidally enlarged toward the bottom 3 and slightly inclined toward the pot wall 4.

The first part 12 of the opening 10 is rectangularly formed and has a longitudinal axis 17 extending in the radial direction of the pot 2. In FIG. 1 the longitudinal axis 17 is schematically shown only with respect to one opening 10. It is further apparent from FIG. 1 that the length of the first part 12 of the opening 10 is larger than the width thereof.

The second part 13 of the opening 10 formed in the region of the pot wall 4 close to the base is trapezoidally formed and enlarged to the base 3 according to the first embodiment as shown in FIGS. 1 to 4 such that the form of this second part 13 of the opening 10 nearly corresponds with the form of the wall 16 supporting the ridge 15.

Due to the form of the openings 10 according to the present invention there is on each side of each ridge 15 a passage opening 20 shaded (section-lined) in FIGS. 1 to 4, respectively. It is explicitely emphasized that for a better survey the passage openings 20 as well as the openings 11 in the base 3 are shaded and, in contrast to otherwise normal graphical representations, do not symbolize a section. According to the present invention each passage opening 20 extends directly up to the pot wall 4.

A further embodiment of the subject matter of the present invention is shown in the left part of FIG. 4. The ridge 15 shown therein comprises on its bottom side 21 in the level of its radial center line 22 over its entire length an equally radial, vertical partition wall 23 the bottom edge 24 of which is nearly aligned with the bottom side 25 of the base 3. The partition wall 23 therefore subdivides the space between the ridge 15, wall 16, the passage openings 20 and the first part 12 of the opening 10 concentrically in a radial direction. Also the second part 13 of the opening 10 which is arranged in the region of the top wall 4 close to the base, is concentrically subdivided by the partition wall 23.

According to FIGS. 1 and 2 four rectangular openings 10 are altogether provided in addition to four circular openings 11 in the base. Adjacent openings 10 enclose an angle 26 of about 90° in the circumferential direction of the pot 2 (see FIG. 4), respectively. It is apparent that the openings 10 may also enclose an angle other than 90°. This is especially true with respect to pots having a larger diameter and/or with respect to pots having more or less than four openings.

According to another embodiment of the present invention, the pot wall 4 comprises a plurality of substantially vertical guide ribs 27 which extend from the inner side 30 of the pot wall 4 toward the inner space 14 of the pot in a radial direction starting from the shoulder 5 up to the base 3. It is further to be seen from the Figures that each guide rib 27 has a nearly triangular cross-section and that the pot 2 has four guide ribs according to the choosen embodiment. Adjacent guide ribs 27 enclose an angle 31 of about 90° in the circumferential direction of the pot 2. Guide ribs 27 alternate with openings 10 in the circumferential direction of the pot 2. This is clearly to be seen in the schematical top view shown in FIG. 2 of a pot 2 formed according to the present invention. It is apparent that the guide ribs 27 are arranged in parallel with the pot wall 4, and that, therefore, opposing guide ribs 27 are conically tapered toward the base 3 and that more or less than the shown four guide ribs may be provided such that also the angle 31 enclosed by adjacent guide ribs may change. The above mentioned angle 31 of 90° is therefore only stated as an example. The arrangement and form of the guide ribs further facilitates the stacking of a plurality of pots 2 one upon the other, since the guide ribs 27 engage each other, respectively, if a pot is inserted into another, lower pot from above. The openings 10 of the upper pot are aligned with the ridges 15 of the lower pot.

The pot 2 may be made for instance of plastic material and may be manufactured by an injection molding or deep drawing process.

It is apparent that the device 1 according to the present invention may have an arbitrary cross-section, but that the device is preferably shaped in a circular or angular form. It is further possible to completely delete the openings 11 or, if circular openings 11 are formed in the base, to vary form and number of these openings. Furthermore, the invention is not delimited to the shown form and number of the rectangular openings 10 and the also rectangular passage openings 20. It is likewise possible to provide for example curved or semicircular openings 10 and correspondingly curved passage openings 20.

Figure 5:
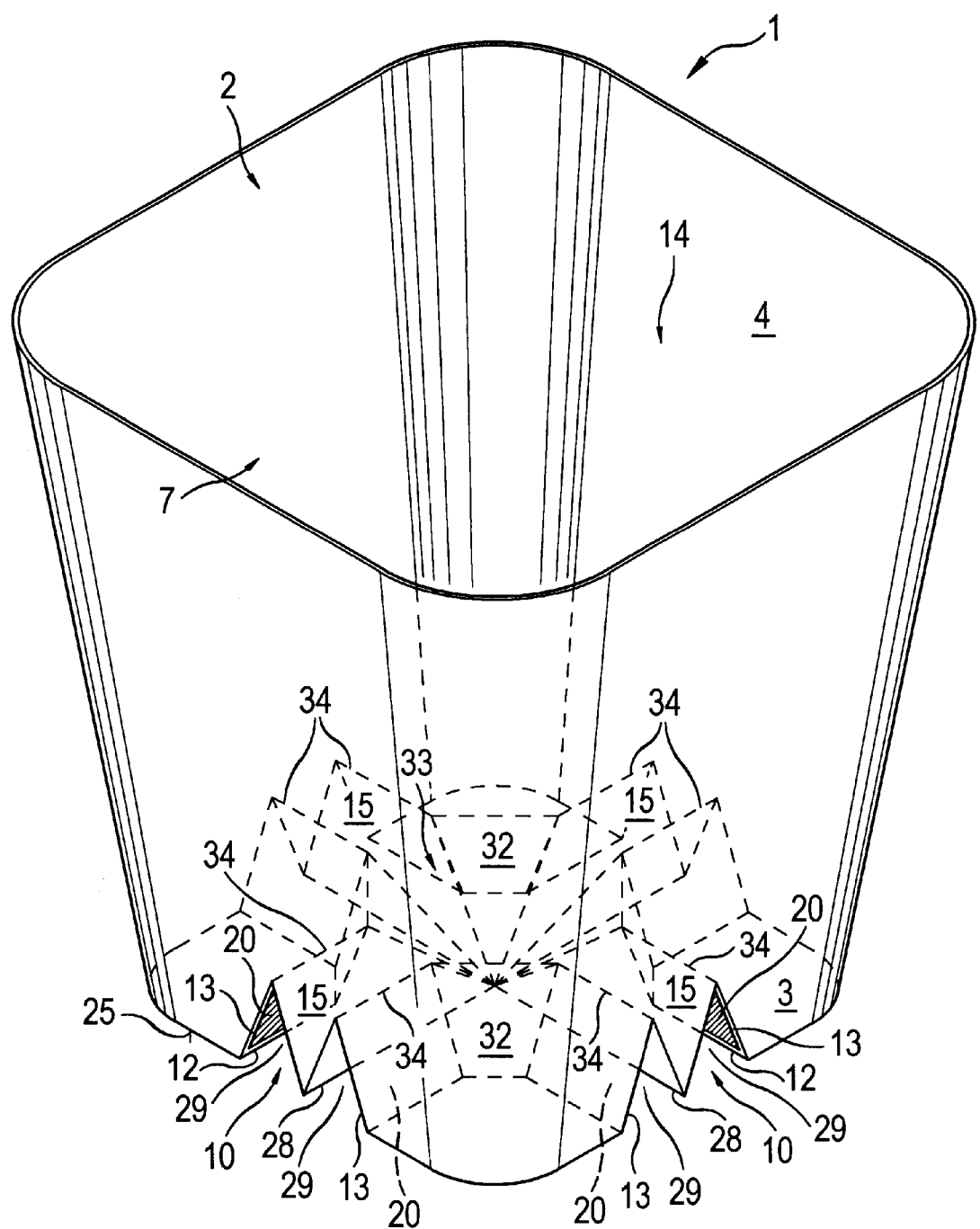
FIG. 5 is a perspective view of another embodiment of the device having V-shaped ridges.

A further embodiment of the device 1 according to the present invention is shown in FIG. 5, identical features indicating identical reference numerals if compared to the first embodiment according to FIGS. 1 to 4.

The ridge 15 of this embodiment is V-shaped having a tip 28 directed to the first part 12 of the opening 10. The second part 13 of the opening 10 thus has the form of two adjacent triangular openings 29 having tips 34 directed to the filling opening 7 of the pot 2, respectively. According to FIG. 5, the tip 28 of each ridge 15 lies in the same plane as the bottom side 25 of the base 3 of pot 2.

Also in this embodiment the visible passage openings 20 are shaded. As already stated with respect to FIGS. 1 to 4 the shading regarding the passage openings 20 does not represent a section but an open area through which the roots may come from the inner space 14 of the pot to the outer side and, hence, in contact with light and air.

Adjacent ridges 15 are connected to each other through walls 32 at their ends directed to the center point of the pot such that a trough-shaped recess 33 is formed in the center of the pot 2. It is apparent that the passage openings 20 as well as the sides of each ridge 15 are inclined to the vertical. The same is true regarding the form of the walls 32. Due to these features also pots 2 of this embodiment may be stacked without problem.

The device according to the embodiment shown in FIG. 5 is especially suitable for small, preferably nearly square pots having curved edges. The dimensions of such pots are about between 7 cm×7 cm×7 cm (length×width×height) and 13 cm×13 cm×13 cm (length×width×height). Pots exceeding the last mentioned volume are preferably formed according to the embodiment shown in FIGS. 1 to 4.

Figure 6:
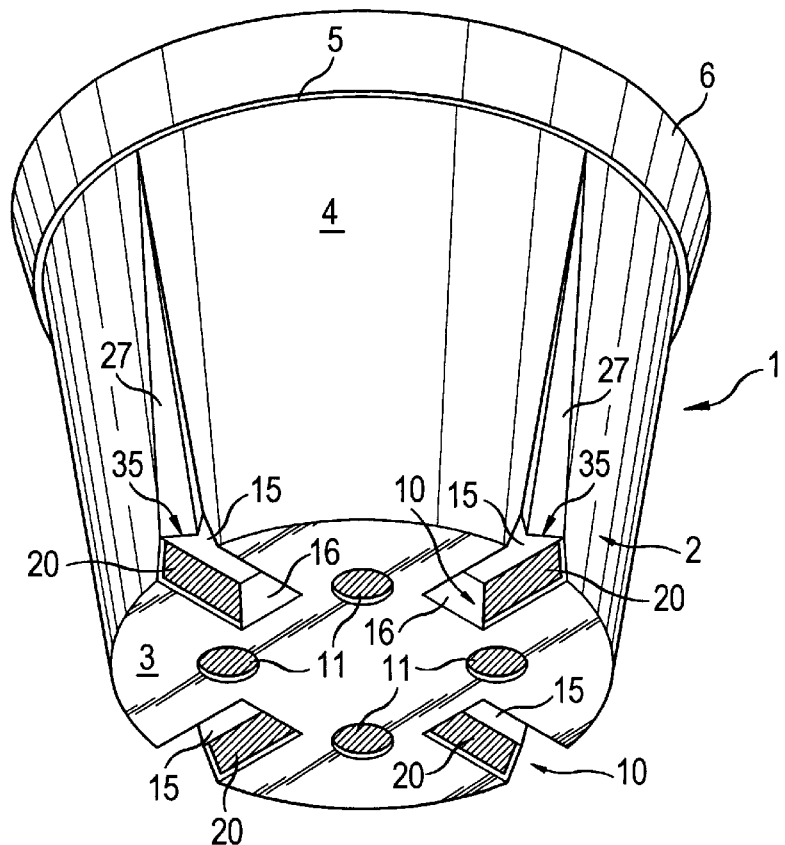
FIG. 6 is a perspective view of a further embodiment of the device from the bottom having guide ribs above the ridges.
Figure 7:
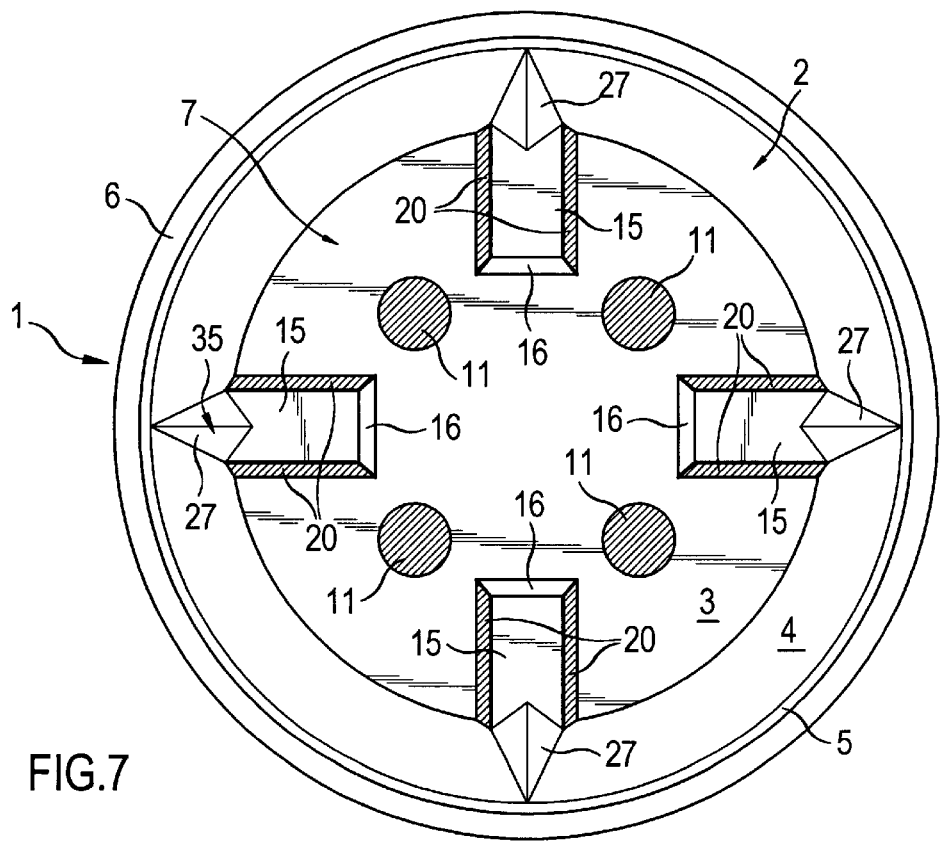
FIG. 7 is a schematic top view of the device according to FIG. 6.

Still a further embodiment of the device 1 according to the present invention is shown in FIGS. 6 and 7. Also in these graphical representations the shaded areas show through-openings.

According to the perspective view of FIG. 6 each guide rib 27 is disposed above a ridge 15. Thus, a guide rib 27 respectively extends away from a ridge 15 along the pot wall 4 toward the upper edge 6 of the pot. According to this embodiment the cross-section of each guide rib 27 decreases from ridge 15 toward the filling opening or the edge 6 of the pot such that each guide rib tapers toward its upper end. It is further to be seen from FIG. 6 that each ridge 15 ends directly at the lower end of each guide rib 27. A nearly triangular recess 35 is thereby formed at the end of each ridge close to the pot wall, the area of said recess nearly corresponding with the cross-section of the lower end of each guide rib 27. This embodiment has the advantage that there is still more incident light in the openings such that the root tips earlier come into contact with air and light in the region of the passage openings 20 and die thereby.

In the following the handling of the device according to the present invention for growing plants is described in more detail regarding the embodiment shown in FIGS. 1 to 4.

In the pot 2, the bottom 3 of which is downwardly arranged, first of all the appropriate substrate, like for example humus, is filled in through the upper filling opening 7. Then the plant-seed, the plant-layer, the scion or the young plant is set in the substrate. The size of the pot is dependent on the size of the respective plant. It is often necessary during the growing or the further cultivation of the plants that the plants are repotted according to their size, i.e. that the plants first of all are set in small pots and are later repotted into larger pots every one or two years.

The growing roots tend to grow downwardly like a star away from the overground part of the plant. If the roots (not shown) strike against the pot wall 4, they further grow downwardly along the pot wall in a spiral manner, until the roots strike against one of the guide ribs 27. The guide ribs divert the roots in radial direction or toward the base in axial direction such that after further root growing the root tips soon strike against the base 3 and, after further expansion in the circumferential direction, on one of the passage openings 20. Since there is no substrate but light and air in the passage openings, the root tips die in the region of the passage openings 20. As a result, the unwanted turning growth of the roots is effectively prevented in a simple manner.

What is claimed is:

1. A device for growing plants, comprising:
    at least one pot having at least one opening in its base, the at least one opening having a first part formed in the base and extending up to a pot wall and an adjacent second part formed in said pot wall, said second part trapezoidally enlarging toward the base and being formed in a region of the pot wall close to the base, and;
    at least one ridge which is substantially horizontal, at least partly set at a distance from the base and covers the first part of the at least one opening by forming lateral passage openings;
    the first part of the at least one opening and each passage opening have a longitudinal axis extending in the radial direction of the pot and one end of the at least one ridge being connected to the pot wall at the second part of the at least one opening.

2. Device according to claim 1, characterized in that the other end of the ridge is connected with the base by means of a vertical wall.

3. Device according to claim 1, characterized in that the ridge is slightly narrower and shorter than the underlying first part of the at least one opening formed in the base and that the wall is slightly inclined toward the pot wall.

4. Device according to claim 1, characterized in at least one ridge comprises on its bottom side directed to the first part of the at least one opening formed in the base in the level of its radial center line over its entire length an equally radial, vertical partition wall at the bottom edge of which is nearly aligned with the bottom side of the base.

5. Device according to claim 1, characterized in that four openings are provided and that adjacent openings enclose an angle of about 90° in the circumferential direction of the pot, respectively.

6. Device according to claim 1, characterized in that the pot wall comprises at least one substantially vertical guide rib which extends in the radial direction away from the inner side of the pot wall to the inner space of the pot.

7. Device according to claim 6, characterized in that the at least one guide rib has a nearly triangular cross-section which decreases preferably from the base toward the filling opening of the pot.

8. Device according to claim 6, characterized in that four guide ribs are provided and that adjacent guide ribs enclose an angle of about 90° in the circumferential direction of the pot, respectively.

9. Device at least according to claim 5, characterized in that guide ribs alternate with openings in the circumferential direction of the pot or coincide with openings such that one guide rib extends away from each ridge along the pot wall.

10. A device for growing plants, comprising:
    at least one pot having at least one opening in its base, the at least one opening having a first part formed in the base and extending up to a pot wall and an adjacent second part formed in said pot wall, said second part being formed in the region of the pot wall close to the base and having two adjacent triangular openings having tips directed to a filling opening of said pot;
    at least one ridge that is substantially v-shaped, at least partly set at a distance from the base, covering the first part of the at least one opening and forming lateral passage openings, said ridge having a tip directed to the first part of the at least one opening, and;
    the first part of the at least one opening and each passage opening having a longitudinal axis extending in the radial direction of the pot and one end of the at least one ridge is connected to the pot wall at the second part of the at least one opening.

11. A device for growing plants, comprising:
    at least one pot having at least one opening in its base, the at least one opening having a first part formed in the base and extending up to a pot wall and an adjacent second part formed in said pot wall, said second part being formed in the region of the pot wall close to the base and having two adjacent triangular openings having tips directed to the filling opening of said pot;
    at least one ridge which is at least partly set at a distance from the base and covers the first part of the at least one opening by forming lateral passage openings, said ridge having a tip that is substantially parallel to the bottom side of said base, and;
    the first part of the at least one opening and each passage opening have a longitudinal axis extending in the radial direction of the pot and one end of the at least one ridge is connected to the pot wall at the second part of the at least one opening.

* * * * *

UNITED STATES PATENT AND TRADEMARK OFFICE
CERTIFICATE OF CORRECTION

PATENT NO.     : 6,339,899 B1                                    Page 1 of 1
DATED          : January 22, 2002
INVENTOR(S)    : Lruch Lehmann It is certified that error appears in the above-identified patent and that said Letters Patent is hereby corrected as shown below:

Title page,
Item [56], References Cited – please add the following references under
U.S. PATENT DOCUMENTS
-- 5,459,960 A        10/1995      Manlove       47/66
   5,327,679 A        07/1994      Hawthorne     47/73 --

Please add the following the under FOREIGN PATENT DOCUMENTS
-- DE 295517-A5              09-1990         Kuhling --

Column 3,
Line 20, move to next line, new paragraph "It is further...present invention.

Column 4,
Line 32, replace "choosen" with -- chosen --

Column 5,
Line 12, replace "explicitely" with -- explicitly --.

Column 8,
Line 50, replace "have" with -- having --.

Signed and Sealed this

Sixth Day of August, 2002

Attest:

Attesting Officer

JAMES E. ROGAN
Director of the United States Patent and Trademark Office